United States Patent [19]

Lieberum

[11] 3,797,549

[45] Mar. 19, 1974

[54] DETACHABLE TREAD DEVICES FOR AUTOMOBILE TIRES

[76] Inventor: Friedel Lieberum, 211 St. Patrick's Ave., North Vancouver, B.C., Canada

[22] Filed: June 12, 1972

[21] Appl. No.: 262,003

[52] U.S. Cl. .................................. 152/175, 238/14
[51] Int. Cl. ........................................... B60c 27/06
[58] Field of Search ........... 152/174, 172, 175, 179, 152/170, 184, 182, 189, 187, 191, 225, 209, 210, 213, 216, 246; 238/14

[56] References Cited
UNITED STATES PATENTS

| | | | |
|---|---|---|---|
| 1,483,773 | 2/1924 | Brickell | 152/175 |
| 3,532,149 | 10/1970 | McCord | 152/213 R |
| 1,879,790 | 9/1932 | Campbell | 152/187 |
| 2,655,971 | 10/1953 | Gross | 152/175 |
| 2,262,349 | 11/1941 | Webster | 152/175 |
| 1,752,024 | 3/1930 | Parker | 152/177 |

Primary Examiner—Robert G. Sheridan
Assistant Examiner—Richard A. Bertsch
Attorney, Agent, or Firm—Brian J. Wood; Owen J. Jones

[57] ABSTRACT

Detachable tread device adapted to be releasably secured to tires to improve traction thereof. Device has flexible base having sufficient length to encircle tread face of tire and has projecting means extending from one surface adapted to run on road surface, and has suction means extending from opposite surface adapted by deformation to be brought into operative engagement with, and to grip, tread face of tire, thus releasably securing tread device to tire. Overlap of ends is tapered to provide smooth join between ends. Device is fitted to tire by lying device flat on road surface aligned with tire with suction means face upwards, so that, when side edges of tread device straddle tire symmetrically, tread device is secured to tire by rolling tire over tread device.

7 Claims, 6 Drawing Figures

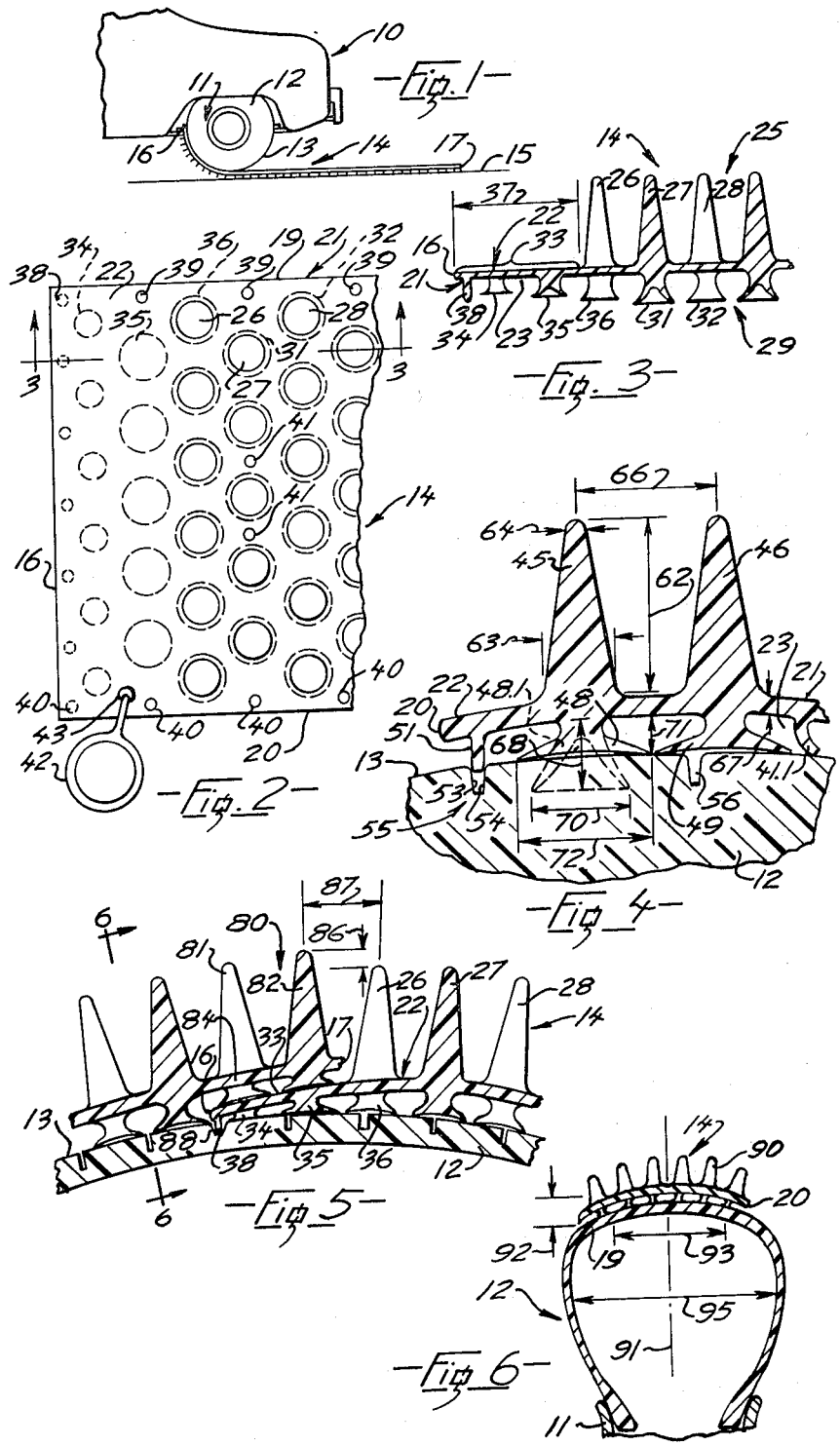

3,797,549

DETACHABLE TREAD DEVICES FOR AUTOMOBILE TIRES

BACKGROUND OF THE INVENTION

1. Field of the Invention

The invention relates to a tread device for attaching to automobile tires to improve traction in snow, mud, and other surfaces.

2. Prior Art

Detachable tread devices for improving traction are old, and can be divided into main groups namely; metal chains, and devices molded from elastomeric material. Devices from both of the above groups are adapted to wrap around the tire and can be either a flat length of traction material that can be joined into a loop around an inflated tire, or can be an endless loop of traction material to be fitted over a deflated tire and held in place when the tire is inflated. Fitting of either type of tread device is time consuming, and some of the devices are unsuitable for running on bare pavement. Some of the devices are carried ready for use and are fitted when needed, often in adverse weather conditions. Detachable tread devices of relatively flat strips of material that require joining are described in U.S. Pat. Nos. 2,856,979 and 2,571,020. Detachable tread devices that are formed as an endless loop are described in U.S. Pat. No. 2,707,014.

Whilst such devices are good for the intended purpose, fitting and removal of the tread device is time consuming and can be inconvenient.

SUMMARY OF THE INVENTION

The invention reduces difficulties of devices known to the inventor by providing a detachable tread device which can be fitted and removed from tires when required without deflating the tire or requiring closure of complex and inconvenient fastening means.

The device according to the invention has a flexible base and a length sufficient to encircle the tread face of the tire. Projecting means, for example studs, extend from an upper surface of the device and are adapted to improve traction of the tire on snow, mud and other surfaces having poor traction characteristics. Suction means, for example suction cups, extend from a lower surface of the device and are adapted, by deformation, to be brought into operative engagement with, and to grip, the tread face of the tire so as releasably to secure the tread device to the tire. When the tread device is laid on the road surface aligned with the tire with the suction means facing upwards and side edges of the device straddle the tire symmetrically the tread device can be secured to the tire by rolling the tire over the device. A controlled overlap and tapering means adjacent end edges of the device provide a smooth join so that an acceptable step adjacent the end edges is attained.

A detailed description following, related to drawings, gives exemplification of apparatus and method according to the invention which, however, is capable of expression in method and means other than those particularly described and illustrated.

DESCRIPTION OF THE DRAWINGS

FIG. 1 is a fragmented side elevation of an automobile showing fitting of a detachable tread device according to the invention under a driving wheel of the automobile, FIG. 2 is a top plan of a portion of the device lying on a flat surface, FIG. 3 is a fragmented section on 3—3 of FIG. 2, FIG. 4 is a fragmented detail section showing a portion of the device in engagement with a tire, FIG. 5 is a fragmented section of a portion of the tire showing means joining opposite ends of the device, FIG. 6 is a fragmented section on 6—6 of FIG. 5.

DETAILED DISCLOSURE

FIG. 1

An automobile 10 has a driving wheel 11 having a tire 12, the tire having a tread face 13 adapted to run on road having a surface 15. A detachable snow tread device 14 according to the invention lies on the surface 15 and has one end edge 16 held adjacent the tire 12 by a suction means to be described, and an opposite end edge 17 lying adjacent the road surface.

FIGS. 2 AND 3

The tread 14 is moulded from a flexible elastomeric material later particularized and has a thin rectangular flat base 21 such as a sheet. The base has opposite parallel side edges 19 and 20, upper and lower surfaces 22 and 23, opposing end portions and a length sufficient to encircle the tread face with small overlap.

The upper surface has a plurality of truncated conical studs severally 25, the studs being arranged in staggered rows extending transversely across the tread. Three rows are seen in FIG. 2, outer studs of which are respectively designated 26, 27 and 28. Adjacent rows are staggered, thus studs of alternate rows are aligned longitudinally as shown in FIG. 2.

The lower surface 23 has a plurality of suction cups 29, also arranged in transverse rows, which rows are spaced beneath the rows of studs so that each stud has an associated suction cup on an opposite side of the base. Whilst it is not essential for a stud to have an associated cup co-axial therewith additional support for the base is provided. Suction cups associated with the studs 27 and 28 are shown in broken outline designated respectively 31 and 32 in FIG. 2. The suction cups extend from, and substantially cover the lower surface of the base, and are adapted to retain the device 14 on the tire as later described with reference to FIG. 4.

As seen in FIG. 3, adjacent the end edge 16 of the lower surface 23 there are three transverse rows of smaller suction cups, one cup of each row being designated 34, 35 and 36. The cup 36, which is associated with the stud 26, is somewhat smaller than the cup 31, and there is a relatively small incremental decrease in size of the cups for the cups 36, 35 and 34. The size of cups decreases to provide a tapering means for a smooth join, as described with reference to FIG. 5; size of cup being defined with reference to FIG. 4. An end portion 33 of the upper surface 22 above the cups 34 and 35 extends from the edge 16 a distance 37 to the row containing the stud 26. The portion 33 is devoid of studs to provide clearance for a controlled overlap of the ends of the tread device when joining the ends at a lap join 80 to be described with reference to FIG. 5.

A row of dowels, one designated 38, extends transversely across the belt parallel to and adjacent the end edge 16. Rows of dowels severally 39 and 40 extend peripherally along the side edges 19 and 20 respectively of the tread device and are generally similar to the dowels 38. Similar dowels are provided at regular intervals in rows parallel to the end edge 16, two such dowels in a typical row being designated 41. The dowels are short parallel cylinders adapted to engage sipes of the tire tread and will be described with reference to FIG. 4. A ring 42 located in a hole 43 in the sheet base adjacent the edge 16 is used for pulling the tread device off the tire.

FIG. 4

Two typical studs 45 and 46 in the rows containing the studs 28 and 27 are shown above two associated suction cups 48 and 49. When the device is secured to the tire, the studs serve as projecting means extending from and substantially covering the base of the device and are adapted to improve traction of the tire. The tread face 13 of the tire 12 has a common tread pattern, the tread face having lugs, and sipes 55 and 56, the sipes being short, shallow cuts in the protruding lugs. A dowel 51 from the row containing the dowels 40 adjacent the edge 20 is shown gripped between side walls 53 and 54 of the sipes 55.

The suction cup 48 is shown in full outline when depressed into operative engagement with the tread face 13, periphery of the cup being flush with the face 13 so as to exclude air and produce a partial vacuum. The cup is shown in broken outline at 48.1 in an unstrained condition before applying to the tire, in which condition the periphery of the suction cup is free of the surface. The cup 48, when in operative engagement with and gripping the tire, is on a portion of the tread face 13 devoid of sipes and tread pattern, otherwise the partial vacuum would not be attained. Suction of the cup arising from the partial vacuum is thus maintained, and provides means to retain the tread device on the tire. The cup 49 covers a portion of the tread containing the sipes 56 and thus the partial vacuum is not maintained as the sipes admit air, making the cup inoperative. The cup 49 is deformed as shown due to proximity of the cup 48 and adjacent similar operative cups (not shown) holding the sheet base close to the tire. Deformation of the cup 49 and similar inoperative cups is generally less than if the cups were in operative engagement. Operative cups thus serve as suction means adapted, by deformation, to be brought into operative engagement with the tread face 13 so as to secure releasably the tread device to the tire.

Commonly the lugs on a tread face have sipes, the sipes being in general short cuts about one to two centimeters long. Spacing between adjacent sipes or lugs is sufficient so as to accept one or more suction cups. Percentage of suction cups rendered inoperative by the tread pattern varies from tire to tire, however a loss of about 50 percent of the gripping between the tire and tread device due to inoperative suction cups would still produce an operative traction device with acceptable slippage between the tire and the tread device.

The dowels 38 through 41 are forced into adjacent sipes, if there is one sufficiently close. These dowels serve mainly as additional means to reduce slippage between the tread device and the tire and augment retention of the tread device on the tire. When the dowel is not gripped, the dowel bends sideways as at 41.1, thus permitting the sheet base to move closer to the tire under the influence of the operative suction cups. The number of dowels held by the sipes is dependent upon the tread pattern of the tire and can vary from about 50 to 80 percent of the total number of dowels.

The stud 45 has a height 62 above the upper surface 22 of typically about 2 centimeters, a maximum diameter 63 adjacent the upper surface 22 of about 8 millimeters, and a minimum diameter 64 at the upper end of about 2 millimeters. Center-to-center distance 66 between adjacent studs is about twice maximum diameter of the studs, e.g. about one point 5 centimeters. Thickness 67 of the sheet base 21 is about 2 millimeters but the thickness tapers to about 1 millimeter at the edge 16 (see FIG. 5). In the unstrained condition the suction cup has a height 68 about 8 millimeters and a diameter 70 across the periphery of about 1 centimeter. When in operative engagement with the tread face, the diameter 70 is increased to a diameter 72, about one point 5 centimeters. The diameter 72 has a maximum determined by the center-to-center distance 66 and an excessive increase in the diameter 72 produces interference between adjacent cups in operative engagement, reducing effectiveness of some of the cups. An increase in center-to-center distance of the studs permits an increase in cup diameter but decreases the likelihood of cups enclosing sipes and being rendered inoperative. For use on some tires, the diameters 70 and 72 may be reduced to avoid excessive loss of suction due to sipes. With reduced cup diameter, additional cups can be fitted in between existing cups so as to increase gripping. When the tread device grips the tire, clearance 71 between the lower surface 23 and the tread face 13 of the tire, is about 3 millimeters.

The material used to make the detachable tread device is suitably a polyurethane plastic or other synthetic rubber compound having a Shor hardness of about 43D. The material has a hardness sufficient to resist wear and has an elasticity sufficient to permit the suction cups to deform when in operative engagement. A range of material hardness and elasticity within limits produces acceptable tread devices, and the dimensions above can be varied from those given depending upon the materials used, expected operational loads, and depending upon the design life of the tread.

FIG. 5

The end 16 provides a tapering means as aforesaid and is adapted to lie essentially flush with the tread face 13 of the tire, the incremental increase in height from the suction cups 34 through 36 producing an acceptably smooth transition from the tread face 13 to the upper surface 22 of the sheet base 21. The end 17 of the detachable tread is cut to a length such that, when the tread is wrapped around a normally inflated tire and most of the suction cups are in operative engagement with the running surface, an end portion 84 adjacent the end 17 overlaps the sheet base by about two rows of suction cups, as seen at a lap join 80. Thus, when the tread device is wrapped around the tire, two studs 81 and 82 at the end portion 84 coincide, or nearly so, with the suction cups 34 and 35. All the studs have the same height from the sheet base, thus the stud 82 projects above the stud 26 producing a step in the tread, the step having a height 86 which height is equal to displacement of the upper surface 22 of the sheet base above the tread face 13 adjacent the cup 35.

Center-to-center distance 87 between the studs 82 and 26 is approximately equal to the center-to-center distance 66 (FIG. 4). The dowel 38 adjacent the end 16 is accepted in sipes 88 and, with other dowels (not shown) adjacent the edge 16, serve to hold the edge 16 adjacent the tread face 13 of the tire. As aforesaid tapering of the sheet base 21 toward the end 16 merges the tread face 13 into the sheet base, thus reducing the step height 86 between the studs 82 and 26 adjacent the two ends of the detachable tread. Lugs and suction cups from the row containing the stud 27 to the end 17 are generally similar, permitting the detachable tread devices to be sold in lengths sufficient to wrap around a maximum diameter tire normally encountered. For use with smaller tires, the tread device is cut to a required length equal to circumference of the tread face, plus an overlap of about four centimeters, being the distance 37 (FIG. 3). The tread device is cut adjacent the end 17 only, so as to maintain effectiveness of the tapered end 16 and the portion 33. As can be seen in FIG. 5, some of the suction cups are adjacent sipes and are thus ineffective for holding the detachable tread to the tire 12.

FIG. 6

The tread face 13 of the tire 12 has curvatures in two planes, namely a primary curvature in a central circumferential plane, designated as a broken line 91 and containing the circumference of the tire at a centerline, and a secondary curvature in a radial plane perpendicular to the central plane and coincident with the section plane of FIG. 6. Generally the primary curvature is greater than average secondary curvature sometimes several orders of magnitude greater depending on tire profile. The secondary curvature is non-circular and has a generally flat center portion designated by a dimension 93.

The tread device 14 is adapted to bend easily to conform to the primary curvature bounded by limits set by the dimension 93. Compound curvature of the tread to conform to the secondary curvature is dependent on tire profile, i.e., the section as seen in FIG. 6, and characteristics of the tread device.

Secondary curvature of the tread device 14 can be conveniently defined in part by reference to a dimension 92, being a radial dimension measured between the lower surface 23 of the sheet base at the plane 91 and a chord line connecting side edges 19 and 20 when the device grips the tire. When the tire has a relatively small width 95 and relatively large dimension 92 excessive compound curvature of the tread device is likely to occur tending to produce buckles along the side edges 19 and 20 of the tread device, the buckles arising from excessive peripheral compression. The buckles can be reduced by moulding the tread device with slight primary and secondary curvature, but this curvature must not be sufficient to prevent the device from lying flat under its own weight on a flat surface as seen in FIG. 1. Slight primary and secondary curvature tends to reduce the peripheral compression as the tread device deforms less to conform to the tire. If the tread device were freely suspended from one end, the lower surface would be concave longitudinally and transversely.

When the tread device 14 is fitted to the tire, it is thus curved slightly conforming somewhat to the section of the tread face as seen in FIG. 6 thus only slightly altering riding characteristics of the tire.

OPERATION

With reference to FIG. 1, to fit the tread device 14 to tires of the driving wheels of an automobile, the tread device is laid with the studs facing downwards towards the road surface 15. The side edges 19 and 20 are spaced equally on either side of the tire in front of or behind the tire so as to straddle the tire symmetrically and the device is generally aligned with the tire. The tread face 13 of the tire and the suction cups are cleaned of foreign matter and, if dry, are lubricated with oil or anti-freeze solution to facilitate sliding of edges of the suction cups when fitting the tread. This procedure is repeated for the tread device and tread face of the opposite wheel. The automobile is then driven carefully over the tread devices so that, as the tires roll over the devices, weight of the automobile deforms the suction cups bringing them into operative engagement with the tread face, and forcing some of the pegs into the sipes. Initially the suction cups at end portion of the tapering means engage the tire, the remaining portion of the device subsequently being brought into engagement and secured to the tread face, the appropriate end portion overlapping the tapering means so as to produce a relatively smooth outer periphery. The automobile drives squarely over the tread so that, as the end edge 17 is fitted into the tire, the edge 17 is parallel with the edge 16 and the side edges 19 and 20 of the tread are each in planes generally parallel to planes containing the driving wheels, and spaced centrally on the tire. Thus, the tread device can be fitted to the tire without having to struggle underneath the automobile to make awkward joins or provision to take up slack. As weight of the automobile is used to compress the suction cups, if the tread device is fitted to the tire when the wheel is unweighted it is likely that the gripping of the cups would be inadequate as the suction cups may be insufficiently deformed.

To remove the tread device from the tire, a ring (not shown) similar to the ring 42 but adjacent the end 17 is pulled, unpeeling the device from the tire by disengaging the suction cups in engagement with the portion 33 of the surface 22. The end portion 84 of the device adjacent the end edge 17 is thus freed from engagement with the portion 33. The end 84 is then weighted, for instance by standing on it, or placing a rock on it, and the automobile is driven in a direction so as to unwind the tread from the tire. The portion 33 is then removed from the tire by pulling the ring 42.

I claim:

1. A detachable tread device to improve traction of automobile tires, the device being adapted to be secured to the tires, the tires having a tread face adapted to be run on a road surface, the tread device including:

a. a flexible base having upper and lower surfaces, the base having a length greater than that required to encircle the tread face of the tire,
   b. projecting means extending from the upper surface of the base the projecting means being adapted to improve traction of the tire,
   c. suction means extending from the lower surface of the base, the suction means being adapted by deformation to be brought into operative engagement, with and to grip, the tread face of the tire so as releasably to secure the tread device to the tire, d. the flexible base has opposing end portions and a length sufficient to produce at a join a controlled overlap of the end portions, one particular end portion having tapering means to provide a smooth join so that an acceptable step adjacent the end portions is obtained, the tapering means including the upper surface of the base adjacent the particular end portion being devoid of projecting means, the suction means provided beneath the particular end portion having sizes which decrease incremantally from a maximum to a minimum height adjacent to the end edge of the base, so that when the tread device is laid flat on the road surface and aligned with the tire and the suction means face upwards, with the side edges of the tread device straddling the tires symmetrically, the tread device can be secured to the tire by rolling the tire over the tread device so that the suction cups of decreased size engage the tire initially, so that the end portion of the tapering means lies substantially flush with the tire so as to produce a smooth transition from the tread face to the upper surface of the tread device, the remaining portion of the device subsequently being brought into engagement and secured to the tread face the opposite end portion overlapping the tapering means so as to produce a relatively smooth outer periphery.

2. A detachable tread device as defined in claim 1 in which the tread face of the tire has sipes and the end portion of the base has:
 i. a row of dowels extending from the lower surface of the sheet base and adjacent to and parallel with the end edge thereof, the dowels being adapted to engage sipes so as to augment retention of the end edge against the tire.

3. A detachable tread device as defined in claim 1, in which the projecting means include:
 j. a plurality of conical studs extending from and substantially covering the upper surface of the base.

4. A detachable tread device as defined in claim 1 in which the suction means include:
 k. suction cups substantially covering the lower surface of the base, adapted to grip the tread face of the tire when deformed into operative engagement.

5. A detachable tread device as defined in claim 4 in which the projecting means are conical studs, and:
 l. the suction cups are coaxial with the studs so that each stud has an associatd suction cup providing support beneath the base.

6. A detachable tread device as defined in claim 1 including:
 m. a row of dowels adjacent the side and end edges of the sheet base, the dowels being adapted to engage sipes of the tire tread to augment retention of the tread device on the tire.

7. A detachable tread device as defined in claim 1, in which the tire has primary and secondary curvatures, in which the tread device is further characterized by:
 n. the lower surface of the sheet base is concave longitudinally and transversely when the tread device is freely suspended from one end, but lies flat when lying on a flat surface with the upper surface uppermost, curvatures being adapted to conform approximately to the primary and secondary curvatures of the tire so that, when the tread device is fitted to the tire, buckling of side edges of the sheet base is reduced.

* * * * *